March 29, 1960

D. P. PERKINS 2,930,194

COMBUSTOR HAVING HIGH TURBULENT MIXING FOR TURBINE-TYPE STARTER

Filed Nov. 19, 1956

2 Sheets-Sheet 1

INVENTOR.
DANA P. PERKINS
BY Robert W. Ely
ATTORNEY

March 29, 1960  D. P. PERKINS  2,930,194
COMBUSTOR HAVING HIGH TURBULENT MIXING FOR
TURBINE-TYPE STARTER
Filed Nov. 19, 1956  2 Sheets-Sheet 2

INVENTOR.
DANA P. PERKINS
BY Robert W. Ely
ATTORNEY

United States Patent Office 2,930,194
Patented Mar. 29, 1960

2,930,194

COMBUSTOR HAVING HIGH TURBULENT MIXING FOR TURBINE-TYPE STARTER

Dana P. Perkins, New Hartford, N.Y., assignor to Bendix Aviation Corporation, Utica, N.Y., a corporation of Delaware Application November 19, 1956, Serial No. 622,886

6 Claims. (Cl. 60—39.65)

The present invention relates to fuel-air combustion starters for jet aircraft engines and more particularly concerns a combustor for generating hot gases for driving a turbine in such starters.

An object of the present invention is to provide an improved compact combustor which has reliable ignition and thorough combustion.

Another object is to provide a compact combustor in which fuel supply means and spark ignition means are axially positioned at the smaller rearward end of a flared chamber while air is introduced adjacent the smaller end in a turbulent manner and also toward the smaller end in a swirling manner.

An additional object is the provision of an air-cooled, double-walled combustor having axial ignition, axial fuel supply, and a particularly-arranged multiplicity of air inlets including tubes and louvers which give reliable ignition and thorough combustion.

Figure 1:
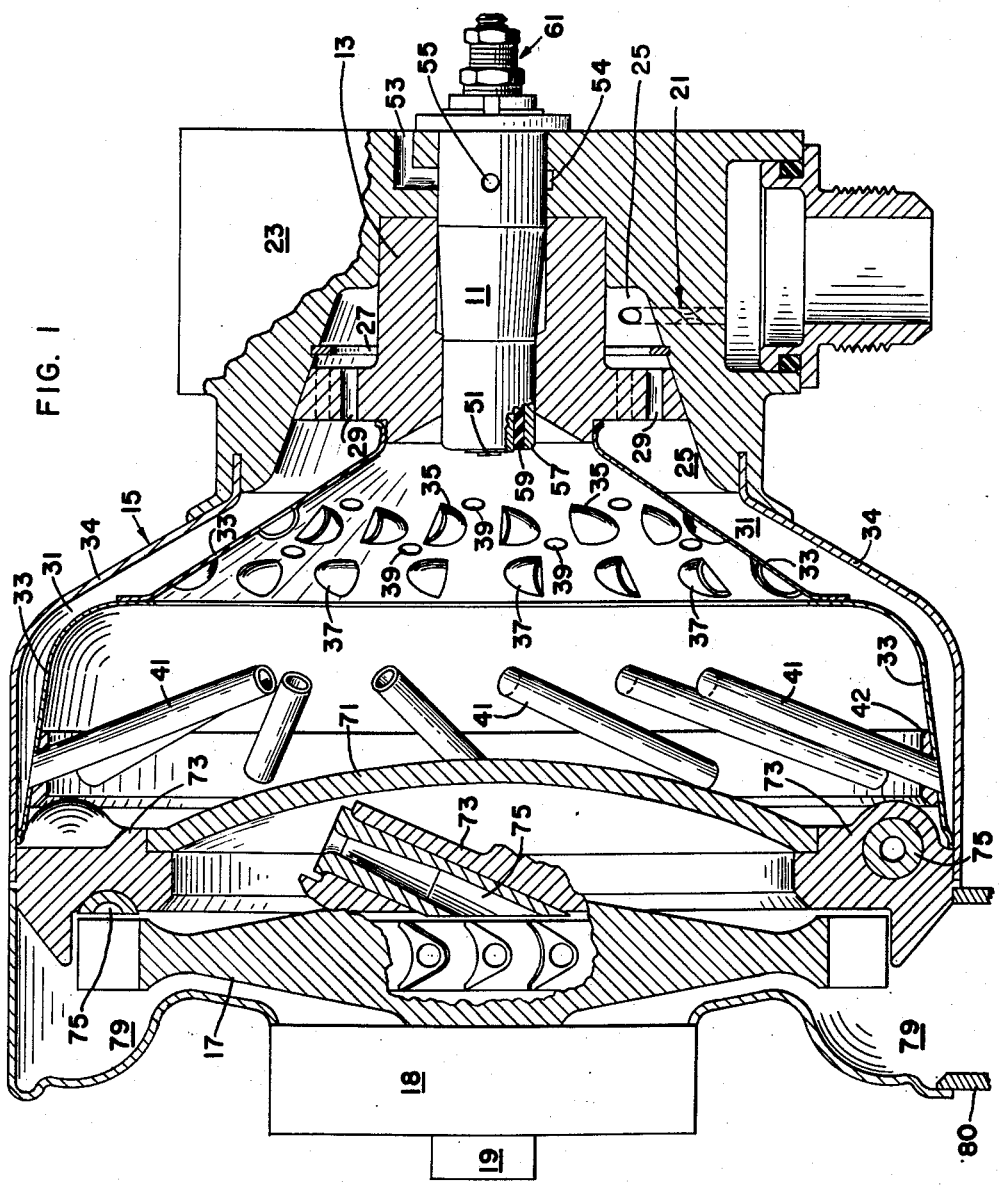
Figure 2:
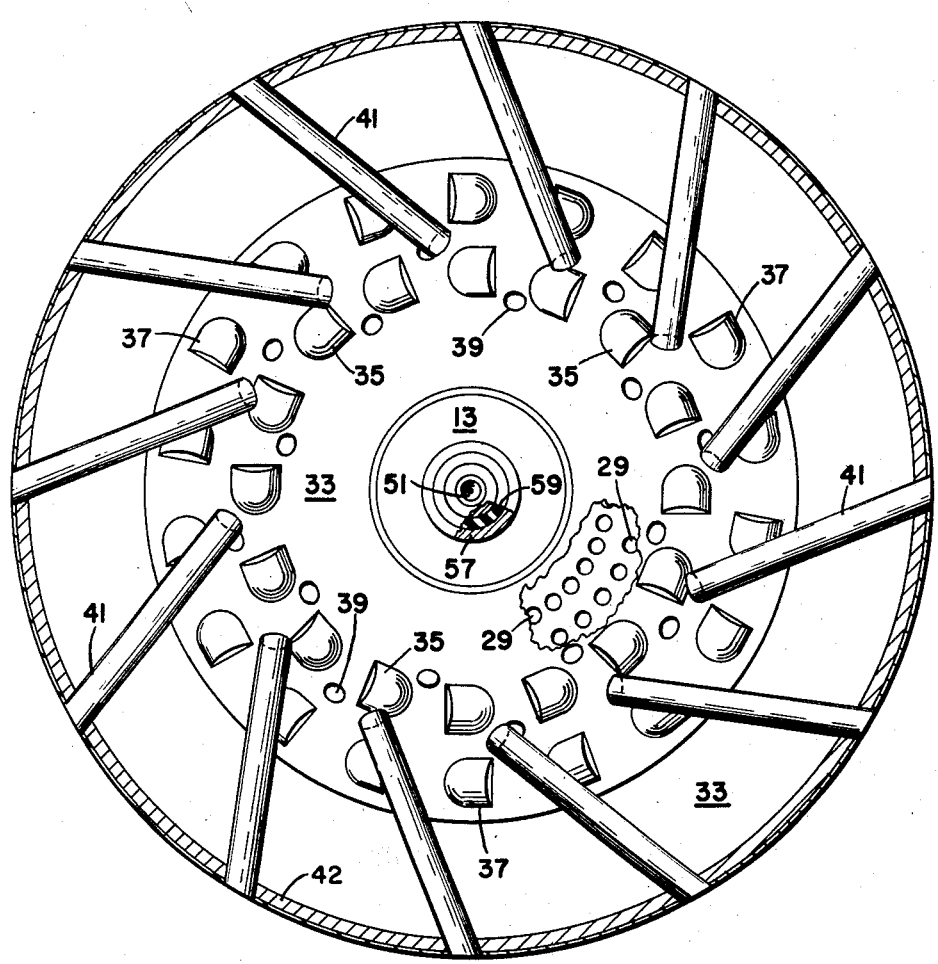

The achievement of the foregoing objects and others, along with the advantages of the present invention, will be apparent from the following description and drawings in which:

Fig. 1 is a cross-sectional view, with parts diagrammatically shown, of a fuel-air combustion starter embodying the invention; and Fig. 2 is a plane view of the inner arrangement of the combustor as seen from the turbine end of the starter and with parts broken away to show internal construction.

The major components of the starter embodying the present invention are the axially-located igniter and fuel spray assembly 11, the air straightener 13 surrounding the igniter assembly, the double-walled combustion chamber 15, the turbine 17, the diagrammatically-shown reduction gearing and unidirectional clutch 18 and the diagrammatically-shown starter gear or jaw 19. It is to be noted that the overall flow of fuel, air and gases is from the smaller rearward end of the combustor to the larger forward end adjacent the turbine 17. With reference to Fig. 1, it can be realized that air is supplied tangentially through pressure reducing nozzle 21 (shown schematically) in the annular mounting block 23 to annular swirl chamber 25. The nozzle 21 discharges air along the outer wall of the swirl chamber 25. The swirling air spills over annular plate 27 and discharges through two rings of holes 29 in the forward annular shoulder of the air straightener 13. It is to be noted with reference to Fig. 2 that these two rings of equi-spaced holes 29 are radially offset. Each ring has thirty-six holes so that in effect an annular honeycomb structure is provided. By means of the plate 27 and the plurality of holes 29, it is possible to introduce air through the side of mounting block 23 and yet to discharge it through holes 29 with uniform distribution and in straight line flow.

The air from holes 29 enters an air cooling and distributing channel 31 which is formed by the inner wall 33, the forward part of mounting block 23, and the outer wall 34. Walls 33 and 34 are made from high temperature resistant material. It is to be noted that the inner wall 33 is formed by a first conical section or sharply-flared turbulator plate and a second slightly-flared, cylindrical section or wall member attached to the large end of the plate. The short truncated conical section has two rings of pocket-type louvers 35 and 37 at the inner part thereof. The inner ring of louvers 35 discharges air along the inner wall in a counterclockwise direction while the outer ring of louvers 37 discharges air along the wall in a clockwise direction, these directions being in reference to the right end of the starter. The first section of inner wall 33 also has two rings of equi-spaced holes 39. These holes 39 are circumferentially offset with respect to the louvers 35 and to each other as appears in Fig. 2. One ring is between the rings of the louvers 35, 37, and the other ring is axially inward from the outer or smaller diametered ring of louvers 35. Thus, part of the air in channel 31 flows into the combustion chamber radially through holes 39 and peripherally through the reversed rings of equi-spaced louvers 35 and 37. It is to be noted that the conical section is inclined sixty degrees with respect to the axis of the combustion chamber and that the axial length of the conical section is about equal to the axial length of the flared cylindrical section.

The remainder of the air in channel 31 flows between the inner and outer walls 33 and 34 to the entrances to tubes 41 at the forward end of channel 31 at the larger forward end of the combustor. Tubes 41 direct the remainder of the air inwardly and slightly rearwardly into the combustion chamber toward the smaller rearward end of the combustor. Tubes 41 are inclined rearwardly at a twenty-two degree angle from the vertical plane through their bases. Tubes 41 are brazed to an annular plate 42 positioned at the forward end of wall 33. With reference to Fig. 2, it can be seen that there are twelve equi-spaced tubes 41 and that these tubes are also at a twenty-two degree angle to radial lines extending from the longitudinal axis of the combustion chamber to the bases of the tubes. By this construction and due to the length of the tubes 41, air is discharged at interior locations and in a direction which is tangential to an imaginary circle which has a slightly smaller diameter than the diameter on which the radially outer ring of louvers 37 is located. As seen in Fig. 2, this imaginary circle has a diameter about one-third the diameter of the cylindrical section. With this arrangement, the air discharged from adjacent tubes merge on the circumference of a circle having a diameter about equal to one half the diameter of the cylindrical section or a circle slightly smaller than the radially outer ring of louvers to produce a swirl effect. It is to be noted that obtuse angles are included between the inner discharge ends of the tubes and radial lines extending to these ends. It is also to be noted that the ends of tubes 41 are substantially longitudinally-aligned with the louvers.

Referring now to the combined igniter and fuel nozzle assembly 11, it can be seen that a fuel spray nozzle 51 is located on the longitudinal axis of the starter at the reduced end of plate 33. This nozzle 51 is of conventional design and is adapted to discharge a ninety degree conical swirling spray of fuel into the combustion chamber. The fuel is supplied through passage 53 and annular chamber 54 to ports 55 of the assembly 11. Internal passages (not shown) direct the fuel to spray nozzle 51 of the nozzle unit. Spark for ignition is also provided by the nozzle-igniter 11. This assembly has an outer annular sleeve 57 and an electrically insulating annular sleeve 59 and other insulation means (not shown) between metallic sleeve 57 and the metallic nozzle 51 and the interior nozzle unit. This concentric arrangement is shown in Fig. 2. The inner metallic parts of the fuel spray structure are connected by means of connector 61 to a suitable source of electricity. The annular sleeve 57 is grounded by means of the starter structure or is otherwise connected so that a spark gap is provided between the outer edge of the nozzle 51 and annular sleeve 57. In this manner, a spark is initially provided which jumps over and above the annular insulating sleeve 59 to ignite the fuel-air mixture adjacent thereto. A similar insulation and spark gap arrangement is shown in U.S. Patent No. 2,255,203 issued to Wiegand. It is to be noted that air from louvers 35, 37 which are longitudinally spaced forward of the ignition means does not flow over the ignition means. Also the air introduced by tubes 41 is not directed across or over the ignition means.

The combustion chamber is closed at the downstream end thereof by domed plate 71. This plate curves slightly inwardly from the downstream edge of the cylindrical section of the inner combustion wall 33. Plate 71 is mounted in the annular nozzle structure 73. Nozzle structure 73 has mounted therein a plurality of equi-spaced nozzles 75 for directing the hot combustion gases suitably against the buckets of turbine wheel 17. The nozzles thus provide peripheral outlet means for the gases. After driving the turbine wheel 17, the exhaust gases flow to exhaust manifold 79 and are suitably discharged by outlet 80. The shaft of the wheel 17 is connected to reduction gearing and overriding clutch 18. The gearing can be any conventional means for reducing the shaft speed of the turbine wheel to a speed which is suitable for driving a jet aircraft engine through starter gear or jaw 19. The clutch is of the type which does not permit the engine to drive the starter.

It is to be noted that the forward larger part of the combustion chamber has a diameter which is about twice the length of the combustion chamber and hence a closed compact chamber is provided. This short, sharply-flared combustion chamber having a reduced end and an enlarged section has two interacting and principal means for introducing air and getting thorough mixing in an improved manner. The opposed louvers 35, 37 admit air circumferentially along the inner surface adjacent the reduced end and this results in air being introduced in a turbulent manner at the sharply-flared part of the chamber, forward from the igniter at the smaller rearward end of the combustor. Tubes 41 admit air into the shallow bowl-shaped chamber forwardly the louvers and radially inwardly from the rearward end of the cylindrical wall. Since the tubes are inclined rearwardly and are tangentially arranged, the air is directed rearwardly in a swirling manner and not over the igniter. The swirling effect imparted to air, as well as its rearward motion, together with the turbulent flow from the louvers, results in improved fuel-air mixing. This mixing arrangement results in a compact combustor which is particularly adapted to provide gases for a turbine-type aircraft starter.

In operation, pressurized cold air is passed through the plurality of air straightening passages 29 into the rear part of the annular distributing and cooling channel 31. Part of the high velocity air is immediately introduced into the combustion chamber through reversed louvers 35 and 37 and holes 39 in the conical part of wall 33. This air is thus divided into multiplicity of flows which are initially tangentially-counterclockwise, tangentially-clockwise, and radial. The resulting turbulent air which is introduced slightly forward of the ignition means mixes with the ninety degree spray of fuel from nozzle outlet 51. The remainder of the air continues to flow in annular channel 31 formed by the combustion chamber wall 33 and outer wall 34 and effectively cools and protects the walls. Upon reaching the inlets of tubes 41, the remainder of the air passes through these tubes into the radially-inward, axially intermediate part of the combustion chamber as a swirling flow which mixes with fuel and does not flow over the igniter. A combustible fuel-air mixture is thus provided adjacent the igniter and is easily ignited. Being introduced at inwardly-spaced locations, air does not cool gases entering the turbine nozzles 75 and does not contribute to poor combustion adjacent the turbine nozzles or combustion chamber and wall 71. Thorough and rapid combustion is thus achieved due to various cross flows, after initial ignition and as the supply of additional air and fuel is continued. Thus, a flow of hot gases to nozzles 75 for driving the turbine 17 is provided. By means of reduction gearing 18 and jaw 19, a jet engine having a mating gear coupled to gear 19 is brought to starting speed in a very short time.

From the foregoing, it is believed apparent that an improved starter combustor means for giving consistent initial ignition and thorough subsequent combustion has been provided. It is to be noted that the several means for introducing air provide cross flows which result in adequate mixing for consistent ignition. The louvers introduce reverse air streams which result in air being admitted in a turbulent manner. The tubes project air rearwarly toward the louvers and tangentially with respect to an imaginary circle giving a swirl effect and further turbulence and cross-flows. These cross-flows and resulting random flows give improved fuel-air mixing and result in thorough rapid combustion. The double-walled structure provides for cooling by the air flow between the walls during the short but high temperature combustion period so that lighter weight material can be used.

It is to be understood that persons skilled in the art can make changes in the disclosed embodiment of the invention without departing from the invention as set forth in the following claims.

What is claimed is:

1. A combustor comprised of means defining a shallow bowl-shaped chamber having a small rearward end and forwardly-extending side walls, fuel supply means for spraying fuel axially into said chamber, said fuel supply means being axially positioned at the small part of said chamber, ignition means in said chamber positioned adjacent said fuel supply means, air supply means including reversed rings of pocket-type louvers for admitting air in a turbulent manner into said chamber along the inner surface of the smaller end of said chamber, air supply tubes arranged to admit air into said chamber forwardly of said first air supply means and radially inwardly from the side walls forming the intermediate part of said chamber, said air supply tubes being arranged to direct air rearwardly toward said first air supply means in a swirling manner, and outer wall means surrounding said side walls to form a continuous annular air channel for supplying air to said air supply means and said tubes and thereby cooling said walls.

2. A combustor comprised of a flared, short combustion chamber having a reduced rearward end and an enlarged forward section, fuel supply means positioned axially at the reduced end of said flared chamber so that fuel is sprayed axially into said chamber, the enlarged section of said chamber being closed by a forward wall having peripheral openings for the discharge of gases, first air supply means for circumferentially introducing a plurality of oppositely directed streams of air along the inner surface of said chamber adjacent said reduced end, second air supply means for introducing air at equi-spaced intermediate locations in the interior of said chamber, said locations being spaced rearwardly from said forward wall and forwardly from said first air supply means, and said second air supply means, at said intermediate locations, being constructed to discharge said air rearwardly and at obtuse angles to radial lines extending from the longitudinal axis of said chamber so that air is directed rearwardly in a swirling manner.

3. A combustor comprised of a flared, short combustion chamber having a reduced rearward end and an enlarged section, fuel supply means positioned axially at the reduced end of said flared chamber so that fuel is sprayed axially into said chamber, the enlarged section of said chamber being closed by a forward wall having peripheral openings for the discharge of gases, first air supply means for circumferentially introducing a plurality oppositely directed streams of air along the inner surface of said chamber adjacent said reduced end, air supply tubes arranged to introduce air rearwardly into the interior of said flared chamber at equi-spaced intermediate locations, the outlets of said tubes being spaced rearwardly from said forward wall and forwardly from said first air supply means, and the outlet ends of said tubes, at said intermediate locations, being arranged at obtuse angles to radial lines extending from the longitudinal axis of said chamber to said outlets so that air is directed in a swirling manner.

4. A combustor comprised of a flared short combustion chamber having a reduced rearward end and an enlarged section, fuel supply means positioned axially at the reduced end of said flared chamber so that fuel is sprayed axially into said chamber, the enlarged section of said chamber being closed by a forward wall having peripheral openings for the discharge of gases, two reversed rings of pocket-type louvers for circumferentially introducing a plurality oppositely directed streams of air along the inner surface of said chamber adjacent said reduced end, equi-spaced air supply tubes extending into the interior of said enlarged section, said tubes being inclined rearwardly and inclined with respect to radial lines from the axis of said chamber to the bases of said tubes so that air is directed rearwardly in a swirling manner.

5. A combustor for an aircraft starter comprised of a short, sharply-flared turbulator plate having a large end and a reduced rearward end, a short annular wall member having rear edge and a front edge, said wall member being attached at said rear edge thereof to the large end of said flared turbulator plate, a domed forward end wall having peripheral outlets attached to the front edge of said annular wall so that a shallow combustion chamber is formed, ignition and fuel supply means extending a small distance axially into said chamber at the reduced end of said plate, said turbulator plate having two rings of louvers projecting into said chamber, said louvers being constructed to discharge air circumferentially along the adjacent inner wall portions of said turbulator plate, said two rings of louvers being arranged so that their circumferential discharge of air enters said combustion chamber in opposite directions, equi-spaced air tubes projecting over said domed end wall and rearwardly into said combustion chamber from the forward part of said annular wall, said tubes being inclined with respect to radial lines extending from the axis of said chamber to the bases of said tubes so that swirling motion is imparted to air from said tubes, said tubes terminating axially forward of said louvers, and said plate and said annular wall being encased by an outer wall means to form a continuous annular air channel for supplying air to said louvers and said tubes and thereby cooling said plate and said wall member.

6. A combustor for an aircraft starter comprised of a short, sharply-flared turbulator plate having a large end and a reduced rearward end, an annular wall member having rear edge and a front edge, said wall member being attached at said rear edge to the large end of said flared turbulator plate, a domed forward end wall having peripheral outlets attached to the front edge of said annular wall so that a shallow combustion chamber is formed, ignition and fuel supply means extending a small distance axially into said chamber at the reduced end of said plate, said turbulator plate having two rings of louvers projecting into said chamber, said louvers being constructed to discharge air circumferentially along the adjacent inner wall portions of said turbulator plate, said two rings of louvers being arranged so that their circumferential discharge of air enters said combustion chamber in opposite directions, equi-spaced air tubes projecting over said domed end wall and rearwardly into said combustion chamber from the forward part of said annular wall, said tubes being inclined with respect to radial lines extending from the axis of said chamber to the bases of said tubes so that swirling motion is imparted to air from said tubes, said tubes terminating axially forward of said louvers and the ends of said tubes being in substantial longitudinal alignment with said louvers, said turbulator plate also having two rings of holes which are circumferentially offset from the outer louvers and each other, one ring being between said rings of louvers, the other ring of holes being axially outward from the outer ring of said louvers, said plate and said annular wall being encased by outer wall means to form a continuous annular air channel for supplying air to said louvers and said tubes and thereby cooling said plate and said wall member and means for introducing air into said air channel essentially as a uniform straight-line flow.

References Cited in the file of this patent

UNITED STATES PATENTS

| | | |
|---|---|---|
| 2,404,335 | Whittle | July 16, 1946 |
| 2,552,492 | Nathan | May 8, 1951 |
| 2,638,745 | Nathan | May 19, 1953 |
| 2,707,373 | Maynor | May 3, 1955 |

FOREIGN PATENTS

| | | |
|---|---|---|
| 516,800 | Belgium | Jan. 31, 1953 |
| 542,528 | France | May 18, 1922 |
| 1,025,198 | France | Jan. 21, 1953 |
| 712,346 | Great Britain | July 21, 1954 |